United States Patent
Mima et al.

(10) Patent No.: US 6,676,264 B1
(45) Date of Patent: Jan. 13, 2004

(54) LASER BEAM FOCUSING APPARATUS AND METHOD FOR FOCUSING A LASER BEAM

(75) Inventors: Kunioki Mima, Takatsuki (JP);
Ryosuke Kodama, Minoo (JP);
Tatsuhiko Yamanaka, Toyonaka (JP);
Yoneyoshi Kitagawa, Minoo (JP);
Kazuo Tanaka, Minoo (JP); Yasuhiko Sentoku, San Diego, CA (US)

(73) Assignee: Osaka University, Suita (JP)

(*) Notice: Subject to any disclaimer, the term of this patent is extended or adjusted under 35 U.S.C. 154(b) by 0 days.

(21) Appl. No.: 10/224,385

(22) Filed: Aug. 21, 2002

(30) Foreign Application Priority Data

Jul. 19, 2002 (JP) .......................................... 2002-211116

(51) Int. Cl.⁷ ................................................. G02B 5/10
(52) U.S. Cl. ........................................ 359/853; 385/125
(58) Field of Search ................................. 359/852, 853; 385/31, 32, 123, 125

(56) References Cited

U.S. PATENT DOCUMENTS 5,462,700 A * 10/1995 Beeson et al. .............. 385/146
5,497,441 A * 3/1996 Croitoru et al. ............. 385/125
6,141,476 A * 10/2000 Matsuura et al. ........... 385/125

OTHER PUBLICATIONS

Kodama et al., "Fast heating of ultrahigh–density plasma as a step towards laser fusion ignition", Nature International Weekly Journal of Science, vol. 412, No. 6849, pp 798–802, 2001.

* cited by examiner

*Primary Examiner*—Euncha Cherry
(74) *Attorney, Agent, or Firm*—Oliff & Berridge, PLC

(57) ABSTRACT

A hollow tube having a pair of openings which have their respective different diameters and are opposed each other is prepared. Then, a pulsed laser beam is introduced into the hollow tube from the larger opening thereof and then, reflected multiply on the inner wall surface of the hollow tube. The introduced pulsed laser beam is focused during the traveling for the smaller opening of the hollow tube to generate a focused laser beam. The thus obtained focused laser beam is output from the smaller opening of the hollow tube.

14 Claims, 3 Drawing Sheets

LASER BEAM FOCUSING APPARATUS AND METHOD FOR FOCUSING A LASER BEAM

BACKGROUND OF THE INVENTION

1. Field of the Invention

This invention relates to a laser beam focusing apparatus and a method for focusing a laser beam, particularly usable for laser nuclear fusion and laser particle acceleration and induced nuclear reactions.

2. Description of the Prior Art

Recently, much attention is paid to such research and development as to generate nuclear fusion by heating instantaneously a ultra high density plasma (solid plasma or more dense plasma) using a short pulse high intensity laser and is also paid to various structural analyses using laser produced high energy particles.

Conventionally, such a high intensity laser beam is generated by focusing a laser beam by a focus lens system or mirror. In such a conventional means, however, it is difficult to focus the laser beam in high intensity because of the wavefront distortion of the laser beam, so a focused laser beam having a spot size of 10 $\mu$m or below is not easy to be realized. In this point of view, such an attempt is made as to focus a laser beam by means of a complicated optical system with an optical waveguide, but the operationallity is deteriorated and the cost is increased because of the complicated optical system.

SUMMARY OF THE INVENTION

It is an object of the present invention, in this point of view, to provide a new apparatus and a new method whereby a laser beam of high intensity can be obtained through focusing a pulsed laser without a complicated optical system.

In order to achieve the above object, this invention relates to a laser beam focusing apparatus comprising a hollow tube having a pair of openings which are opposed each other, one opening serving as a laser beam inlet, the other opening serving as a laser beam outlet, the diameter of the laser beam inlet being set larger than the diameter of the laser beam outlet.

Also, this invention relates to a method for focusing a laser beam, comprising the steps of:

preparing a hollow tube having a pair of openings which have their respective different diameters and are opposed each other, introducing a pulsed laser beam into said hollow tube from the larger opening of said hollow tube reflecting multiply said pulsed laser beam on the inner wall surface of said hollow tube and traveling said pulsed laser beam toward the smaller opening of said hollow tube with condensation, to generate a focused laser beam, and outputting said focused laser beam from the smaller opening of said hollow tube.

The inventor had intensely studied to achieve the above object. As a result, the inventor found out the following fact. First of all, a hollow tube having a pair of openings which are opposed each other is prepared. Then, a given pulsed laser beam is introduced into the hollow tube from the larger opening. In this case, a plasma layer having a thickness much smaller than the wavelength of the laser beam is created on the inner wall of the hollow tube, and the introduced laser beam is reflected multiply on the inner wall of the hollow tube toward the smaller opening from the larger opening to generate a highly focused laser beam. Therefore, when the size of the smaller opening is set to a desired size, the pulsed laser beam can be focused to a diffraction-limited spot size of about 10 $\mu$m and emitted outside.

According to the present invention. only if such a hollow tube having a pair of openings which have different sizes and are opposed each other, a laser beam of high intensity can be easily obtained.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
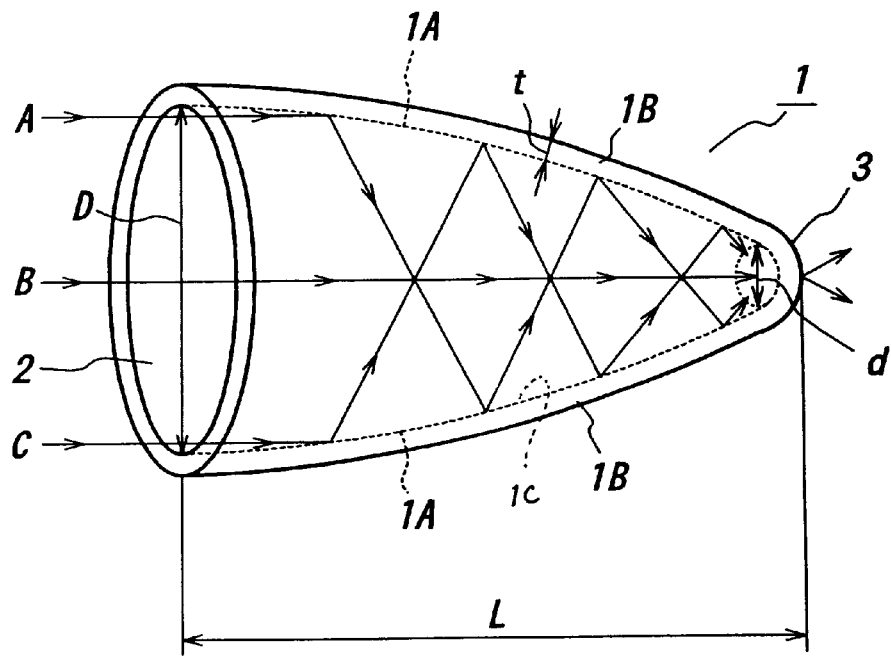
FIG. 1 is a perspective view showing a laser beam focusing apparatus according to the present invention.

This invention will be described in detail with reference to the accompanying drawings. FIG. 1 is a perspective view showing a laser beam focusing apparatus according to the present invention. The laser beam apparatus focusing illustrated in FIG. 1 includes a revolution-paraboloid hollow tube 1 having a pair of openings 2 and 3 which are opposed each other.

The larger opening 2 serves as a laser beam inlet, and the smaller opening 3 serves as a laser beam outlet. The diameter D of the opening 2 is set larger than the diameter d of the opening 3. Concretely the diameter D is preferably set within 100–1000 $\mu$m, particularly within 200–500 $\mu$m. The diameter d is preferably set within 1–100 $\mu$m, particularly within 5–50 $\mu$m. In this case, a pulsed laser beam introduced can be focused effectively to generate a ultra intense laser beam having a diffraction-limited spot size easily. For example, a laser beam having a wavelength of 1 $\mu$m can be focused to a spot size of 10 $\mu$m or less.

Herein, if the diameters D and d of the openings 2 and 3 are set within the above ranges, it is desired that the length L of the hollow tube 1 is set within 0.2–3 mm.

The hollow tube 1 may be made of a laser beam reflection material, and concretely, made of at least one material selected from the group consisting of Pb, W, Au, Cu, Ag, Pt, Al and Fe. In this case, in addtition to the high laser beam reflectionity, the mechanical strength of the hollow tube 1 can be enhanced and it is easy to handle the hollow tube 1 when attached in an apparatus Similarly, the thickness t of the side wall 1B of the hollow tube 1 is preferably set within 5–50 $\mu$m if the tube 1 is made of such a heavy metal as mentioned above.

In order to perform the multiple reflection of the introduced pulsed laser beam effectively without energy loss, the inner wall surface 1A of the hollow tube 1 is made smooth.

Concretely, the average surface roughness Ra of the inner wall surface 1A is set to 1.0 μm or below, preferably 0.05 μm or below.

Next, the focusing principle of laser beam for the laser beam focusing apparatus illustrated in FIG. 1 will be described. A pulsed laser beam from a laser source not shown is spread spatially to some extent and then introduced into the hollow tube 1 through the opening 2. At that time, a plasma layer 1C having a thickness much smaller than the wavelength of the pulsed laser beam is created on the inner wall surface 1A of the hollow tube 1.

The upper component A of the introduced pulsed laser beam is collided with and then, reflected multiply on the inner wall surface 1A to be traveled toward the opening 3 along the direction defined by the arrows. Similarly, the lower component C of the introduced pulsed laser beam is also collided with and then, reflected multiply on the inner wall surface 1A to be traveled toward the opening 3 along the direction defined by the arrows. The center component B of the introduced pulsed laser beam is traveled toward the opening 3 without the multiple reflection for the inner wall surface 1A.

As mentioned above, since the diameter D of the opening 2 is set larger than the diameter d of the opening 3, that is, the diameter d of the opening 3 is set smaller than the diameter D of the opening 2, the upper component A and the lower component C are converged to the center portion of the hollow tube 1 during the traveling for the opening 3. As a result, the introduced pulsed laser beam is focused in the hollow tube 1 to generate and then output a given focused laser beam from the opening 3.

If a pulsed laser beam having a wavelength of 1 μm is employed, it can be focused to a spot size of about 10 μm. If the configuration and size of the hollow tube 1 is controlled appropriately, the pulsed laser beam can be focused to a spot size of about 1 μm.

Figure 2:
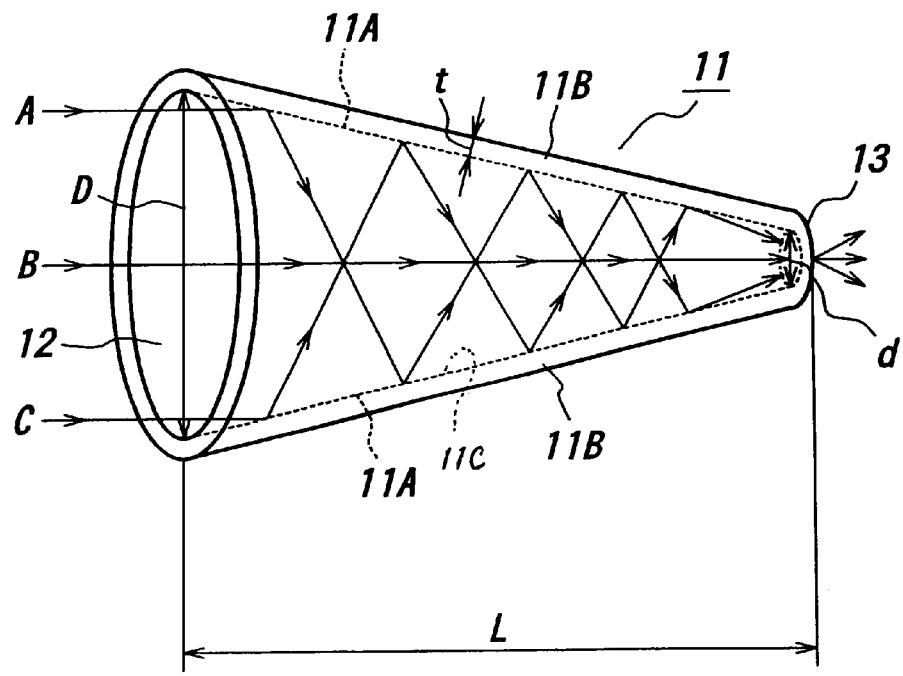
FIG. 2 is a perspective view showing another laser beam focusing apparatus according to the present invention.

FIG. 2 is a perspective view showing another laser beam focusing according to the present invention. The laser beam focusing illustrated in FIG. 2 includes a cone-shaped hollow tube 11 having a pair of openings 12 and 13 which are opposed each other. When such a cone-shaped hollow tube 11 is employed, a pulsed laser beam can be also focused effectively as well as the revolution-paraboloid hollow tube 1 as shown in FIG. 1. Like properties are required for the hollow tube 11 as the above-mentioned hollow tube 1.

The diameter D of the opening 12 is preferably set within 100–1000 μm, particularly within 200–500 μm. The diameter d of the opening 13 is preferably set within 1–100 μm, particularly within 5–50 μm. The hollow tube 11 is preferably made of a heavy metal or the like as mentioned above. The average surface roughness Ra of the inner wall surface 11A is set to 1.0 μm or below, preferably 0.05 μm or below. The length L of the hollow tube 11 is set within 0.2–3 mm, and the thickness t of the side wall 11B of the hollow tube 11 is preferably set within 5–50 μm.

A pulsed laser beam from a laser source not shown is spread spatially to some extent and then introduced into the hollow tube 11 through the opening 12, as mentioned above. At that time, a plasma layer 11C having a smaller thickness than the wavelength of the introduced pulsed laser beam is created on the inner wall surface 11A of the hollow tube 11. The upper component A of the introduced pulsed laser beam is collided with and then, reflected multiply on the inner wall surface 11A located vertically to be traveled toward the opening 3 along the direction defined by the arrows. Similarly, the lower component C of the introduced pulsed laser beam is also collided with and then, reflected multiply on the inner wall surface 11A located vertically to be traveled toward the opening 3 along the direction defined by the arrows. The center component B of the introduced pulsed laser beam is traveled toward the opening 3 without the multiple reflection of the inner wall surface 11A.

As a result, the introduced pulsed laser beam is focused in the vicinity of the opening 13 to generate and then output a focused laser beam from the opening 13. If a pulsed laser beam having a wavelength of 1 μm is employed, it can be focused to a spot size of about 10 μm or less. If the configuration and size of the hollow tube 11 is controlled appropriately, the pulsed laser beam can be focused to a spot size of about 1 μm.

Figure 3:
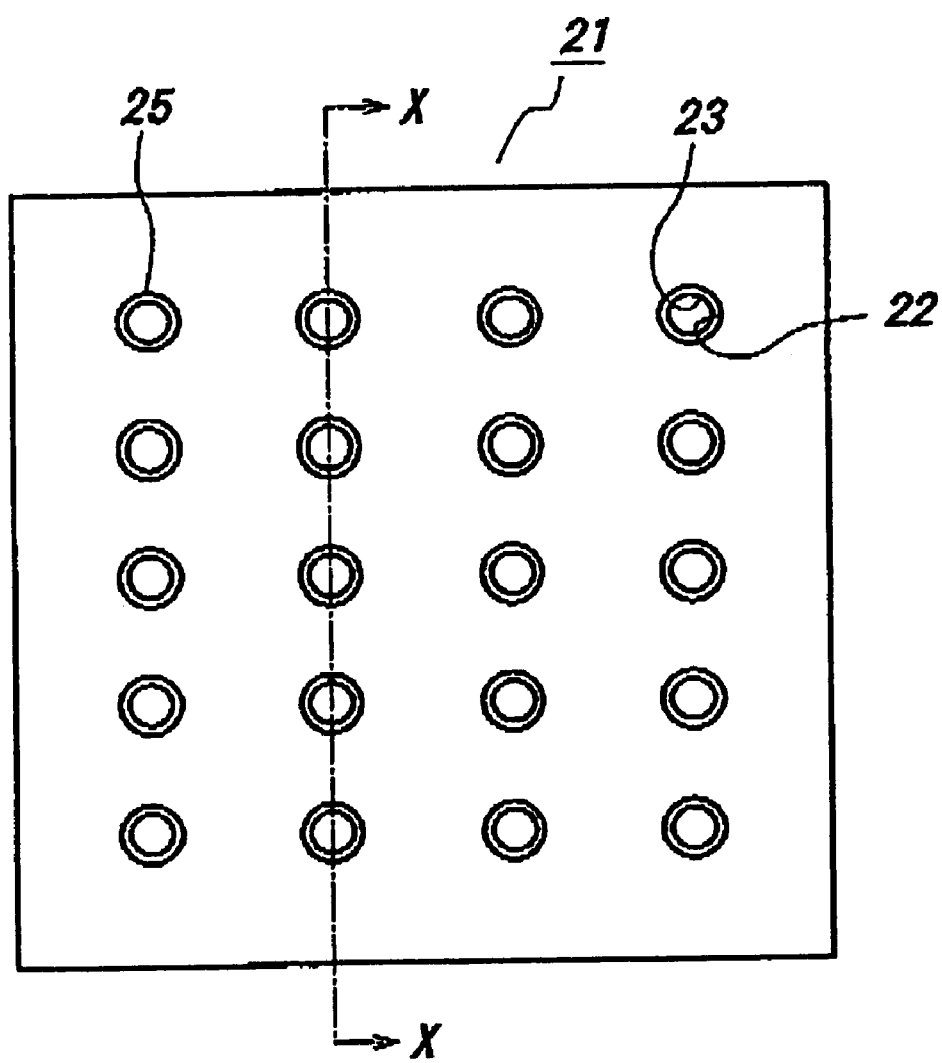
FIG. 3 is a plan view showing a modified laser beam focusing apparatus according to the present invention.
Figure 4:
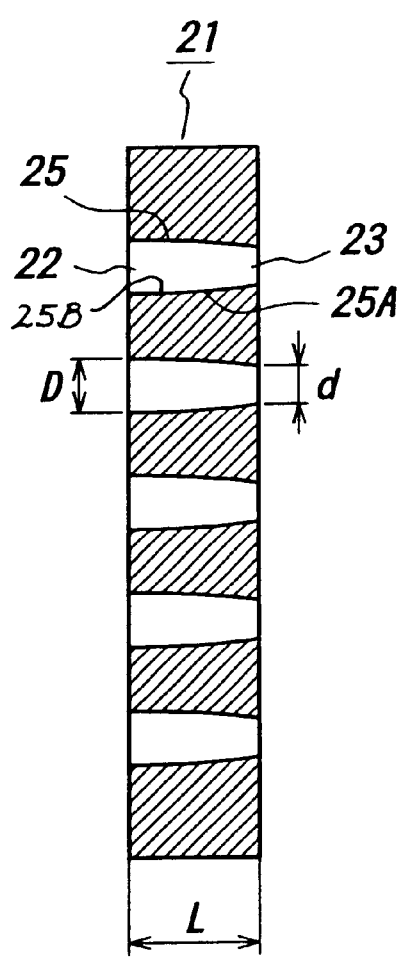
FIG. 4 is a cross sectional view showing the modified laser beam focusing apparatus illustrated in FIG. 3, taken on line X—X.
Figure 5:
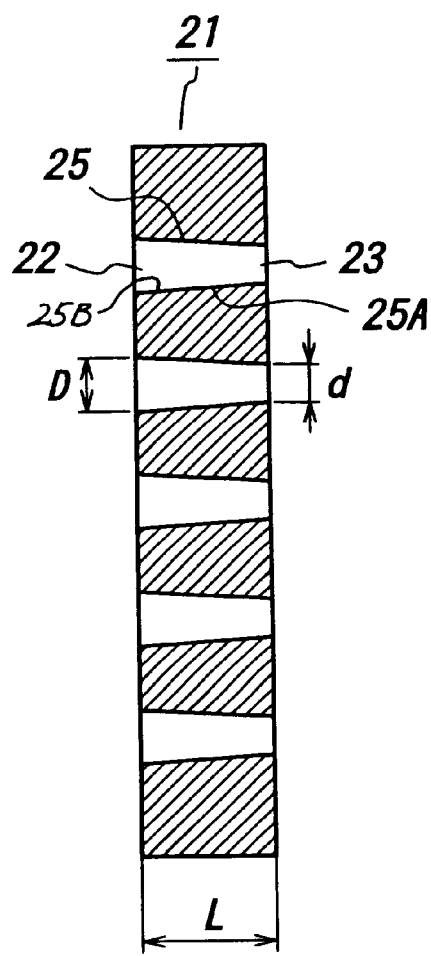
FIG. 5 is a cross sectional view showing the modified laser beam focusing apparatus illustrated in FIG. 3, taken on line X—X.

FIGS. 3–5 are structural views showing a modified laser beam focusing according to the present invention. FIGS. 4 and 5 are cross sectional views of the laser beam focusing apparatus illustrated in FIG. 3, taken on line X—X. The laser beam focusing apparatus illustrated in FIGS. 3–5 is composed of a filmy member 21 having plural pits 25, each pit having a pair of openings 22 and 23 which are opposed each other. Each pit may have a revolution-paraboloid shape or a cone shape as the hollow tube 1 or 11 illustrated in FIG. 1 or 2.

The diameter D of the opening 22 and the diameter d of the opening 23 of each pit and the thickness L of the filmy member 21 may be set in similar fashion to the hollow tube 1 or 11 as shown in FIG. 1 or 2. Also, the average surface roughness Ra may be set in similar fashion to the hollow tube 1 or 11 to be made smooth.

A pulsed laser beam from a laser source not shown is spread spatially to some extent and then introduced into each pit 25 of the filmy member 21 from the opening 22. At that time, a plasma layer 25B having a smaller thickness than the wavelength of the pulsed laser beam is created on the inner wall surface 25A of each pit 25, as explained in FIG. 1 or 2. Therefore, the upper and lower components of the pulsed laser beam are reflected multiply on the inner wall surface 25A of each pit 25 to be traveled toward the opening 23 with converged in the center portion of each pit 25. As a result, the introduced pulsed laser beam is focused in the vicinity of the opening 23 to generate and output a focused laser beam from the opening 23.

In other words, in the laser beam focusing illustrated in FIGS. 3–5, each pit 25 serves as the hollow tube 1 or 11 shown in FIG. 1 or 2. Therefore, the laser beam focusing apparatus illustrated in FIGS. 3–5 is so constructed as having plural laser beam focusing apparatus shown in FIG. 1 or 2. As a result, plural pulsed laser beams can be focused to generate plural high density laser beams simultaneously.

The filmy member 21 may be made of at least one material selected from the group consisting of Pb, W, Au, Cu, Ag, Pt, Al and Fe, as the hollow tube 1 or 11.

Although the present invention was described in detail with reference to the above examples, this invention is not limited to the above disclosure and every kind of variation and modification may be made without departing from the scope of the present invention. For example, although in the above examples, the hollow tube and the pit have revolution-paraboloid shape or cone shape, they may have any shape.

As mentioned above, according to the present invention, a new apparatus and a new method whereby a laser beam of high intensity can be obtained through the focusing of a pulsed laser without a complicated optical system can be provided.

What is claimed is:

1. A laser beam focusing apparatus comprising a hollow tube having a pair of openings which are opposed to each other, one opening serving as a laser beam inlet, the other opening serving as a laser beam outlet, the diameter of said laser beam inlet being set larger than the diameter of said laser beam outlet, wherein the diameter of said laser beam inlet is set within 100–1000 μm, and the diameter of said laser beam outlet is set within 1–100 μm, whereby a plasma layer having a thickness much smaller than the wavelength of a laser beam to be introduced is created on an inner wall of said hollow tube.

2. A laser beam focusing apparatus as defined in claim 1, wherein the average surface roughness Ra of the inner wall of said hollow tube is set to 0.1 μm or below.

3. A laser beam focusing apparatus as defined in claim 1, wherein said hollow tube is made of at least one material selected from the group consisting of Pb, W, Au, Cu, Ag, Pt, Al and Fe.

4. A laser beam focusing apparatus as defined in claim 1, wherein said hollow tube has a revolution-paraboloid shape.

5. A laser beam focusing apparatus as defined in claim 1, wherein said hollow tube has a cone shape.

6. A laser beam focusing apparatus comprising a filmy member having plural pits, each pit having a pair of openings which are opposed to each other, one opening of each pit serving as a laser beam inlet, the other opening of each pit serving as a laser beam outlet, the diameter of said laser beam inlet being set larger than the diameter of said laser beam outlet, wherein the diameter of said laser beam inlet is set within 100–1000 μm, and the diameter of said laser beam outlet is set within 1–100 μm, whereby a plasma layer having a thickness much smaller than the wavelength of a laser beam to be introduced is created on an inner wall of said hollow tube.

7. A laser beam focusing apparatus as defined in claim 6, wherein the average surface roughness Ra of the inner wall of each pit is set to 0.1 μm or below.

8. A laser beam focusing apparatus as defined in claim 6, wherein said filmy member is made of at least one material selected from the group consisting of Pb, W, Au, Cu, Ag, Pt, Al and Fe.

9. A laser beam focusing apparatus as defined in claim 6, wherein each pit has a revolution-paraboloid shape.

10. A laser beam focusing apparatus as defined in claim 6, wherein said hollow tube has a cone shape.

11. A method for focusing a laser beam, comprising the steps of:

preparing a hollow tube having a pair of openings which have respective different diameters and are opposed to each other, one opening serving as a laser beam inlet, the other opening serving as a laser beam outlet, wherein the diameter of said laser beam inlet is set within 100–1000 μm, and the diameter of said laser beam outlet is set within 1–100 μm, introducing a pulsed laser beam into said hollow tube from the larger opening of said hollow tube, reflecting multiply said pulsed laser beam on the inner wall surface of said hollow tube and traveling said pulsed laser beam toward the smaller opening of said hollow tube with focusing, to generate a focused laser beam, outputting said focused laser beam from the smaller opening of said hollow tube, and forming, on the inner wall of said hollow tube, a plasma layer having a much smaller thickness than the wavelength of said pulsed laser beam.

12. A focusing method as defined in claim 11, wherein the spot size of said focused laser beam is 10 μm or below.

13. A method for focusing a laser beam, comprising the steps of:

preparing a filmy member having plural pits, each pit having a pair of opening which have their respective different diameters and are opposed each other, one opening serving as a laser beam inlet, the other opening serving as a laser beam outlet, wherein the diameter of said laser beam inlet is set within 100–1000 μm, and the diameter of said laser beam outlet is set within 1–100 μm, introducing a pulsed laser beam into each pit from the larger opening thereof, reflecting multiply said pulsed laser beam on the inner wall surface of each pit and traveling said pulsed laser beam toward the smaller opening thereof with condensation, to generate a focused laser beam, forming, on the inner wall of said pits, a plasma layer having a thickness much smaller than the wavelength of the laser beam, and outputting said focused laser beam from the smaller opening of each pit.

14. A focusing method as defined in claim 13, wherein the spot size of said focused laser beam is 10 μm or below.

* * * * *